United States Patent
Park et al.

(10) Patent No.: US 11,210,017 B2
(45) Date of Patent: Dec. 28, 2021

(54) BUFFER MEMORY, AND COMPUTATION DEVICE AND SYSTEM USING THE SAME

(71) Applicants: SK hynix Inc., Gyeonggi-do (KR); SK Telecom Co., Ltd., Seoul (KR)

(72) Inventors: Yong Sang Park, Gyeonggi-do (KR); Seok Joong Hwang, Seoul (KR)

(73) Assignees: SK hynix Inc., Gyeonggi-do (KR); SK Telecom Co., Ltd., Seoul (KR)

(*) Notice: Subject to any disclaimer, the term of this patent is extended or adjusted under 35 U.S.C. 154(b) by 0 days.

(21) Appl. No.: 16/598,761

(22) Filed: Oct. 10, 2019

(65) Prior Publication Data

US 2020/0310676 A1    Oct. 1, 2020

(30) Foreign Application Priority Data

Apr. 1, 2019 (KR) .................. 10-2019-0037832

(51) Int. Cl.
*G06F 3/06* (2006.01)
*G06F 5/10* (2006.01)
*G06F 12/02* (2006.01)

(52) U.S. Cl.
CPC .......... *G06F 3/0656* (2013.01); *G06F 3/0614* (2013.01); *G06F 3/0679* (2013.01); *G06F 5/10* (2013.01); *G06F 12/0246* (2013.01)

(58) Field of Classification Search
CPC .... G06F 3/0614; G06F 3/0656; G06F 3/0679; G06F 5/10; G06F 12/0246
See application file for complete search history.

(56) References Cited

U.S. PATENT DOCUMENTS

| | | | | |
|---|---|---|---|---|
| 6,014,125 A | * | 1/2000 | Herbert | G06T 3/4015 345/213 |
| 10,216,653 B2 | * | 2/2019 | Arimilli | G06F 13/1673 |
| 2017/0046101 A1 | * | 2/2017 | Kersh | G06T 1/60 |
| 2019/0319891 A1 | * | 10/2019 | Smith | H04L 47/524 |
| 2019/0377705 A1 | * | 12/2019 | Khan | G06F 15/7867 |

* cited by examiner

*Primary Examiner* — Eric T Oberly
(74) *Attorney, Agent, or Firm* — IP & T Group LLP (57) ABSTRACT

A computation device includes a buffer memory which provides first to b input feature sets to the computation unit. The buffer memory includes first to $n^{th}$ memories, and configured to divide and store the first to $n^{th}$ input feature sets each including a plurality of features in the first to $n^{th}$ memories, respectively. The plurality of features of one input feature set is divided and stored into the first to $n^{th}$ memories. Features having the same turn in the first to $n^{th}$ input feature sets are stored one by one in the first to $n^{th}$ memories.

24 Claims, 5 Drawing Sheets

FIG. 2B $$FD = \begin{bmatrix} F11 & F12 & F13 \\ F21 & F22 & F23 \\ F31 & F32 & F33 \end{bmatrix} \quad WD = \begin{bmatrix} W11 & W12 & W13 \\ W21 & W22 & W23 \\ W31 & W32 & W33 \end{bmatrix}$$

$$FD \times WD = \begin{bmatrix} F11W11 + F12W21 + F13W31 & F11W12 + F12W22 + F13W32 & F11W13 + F12W23 + F13W33 \\ F21W11 + F22W21 + F23W31 & F21W12 + F22W22 + F23W32 & F21W13 + F22W23 + F23W33 \\ F31W11 + F32W21 + F33W31 & F31W12 + F32W22 + F33W32 & F31W13 + F32W23 + F33W33 \end{bmatrix}$$

BUFFER MEMORY, AND COMPUTATION DEVICE AND SYSTEM USING THE SAME

CROSS-REFERENCES TO RELATED APPLICATION

The present application claims priority under 35 U.S.C. § 119(a) to Korean application number 10-2019-0037832, filed on Apr. 1, 2019, in the Korean Intellectual Property Office, which is incorporated herein by reference in its entirety.

BACKGROUND

1. Technical Field

Various embodiments generally relate to an integrated circuit technology, and more particularly, to a buffer memory, and a computation device and a system using the same.

2. Related Art

With the progress of the fourth industrial revolution, technologies related to Internet of things (IoT), mobile, cloud storage, big data analytics and artificial intelligence (AI) are continuously developing. In order to implement the artificial intelligence, techniques such as machine learning and deep learning have been developed. The machine learning and the deep learning are similar to each other in that both techniques compute or classify received inputs to generate an output. Meanwhile, the machine learning may analyze and infer data through algorithms inputted by human beings, whereas the deep learning may analyze and infer data through a deep neural network.

A deep neural network (DNN) circuit may include a matrix operation circuit that performs a MAC (multiply and accumulation) operation on received inputs to generate an output. The matrix operation circuit may perform a convolution operation, and may generally include a systolic array. The systolic array may perform a MAC operation on a set of input features, such as activation inputs, and weight data.

SUMMARY

In an embodiment, a computation device may include a buffer memory and a computation unit. The buffer memory may include first to $n^{th}$ memories, and be configured to store first to $n^{th}$ input feature sets each including a plurality of features in the first to $n^{th}$ memories, and divisionally store the plurality of features of one input feature set into the first to $n^{th}$ memories. The features having the same turn in the first to $n^{th}$ input feature sets may be stored one by one in the first to $n^{th}$ memories, and 'n' may be an integer equal to or larger than two. The computation unit may be configured to receive the first to $n^{th}$ input feature sets stored in the buffer memory, and perform a computation operation on the received input feature sets.

In an embodiment, a computation device may include a buffer memory and a computation unit. The buffer memory may include first to fourth memories, and be configured to store first to fourth input feature sets each having at least first to fourth features in the first to fourth memories, and divide and store first to fourth features of one input feature set in the first to fourth memories. Features having the same turn in the first to fourth input feature sets may be divided and stored in the first to fourth memories so as not to overlap one another. The computation unit may be configured to receive the first to fourth input feature sets stored in the buffer memory, and perform a computation operation on the received input feature sets.

In an embodiment, a system may include a host device and a computation device. The host device may be configured to transfer first input data through a system bus. The computation device may be configured to receive the first input data and perform a computation operation on the first input data. The computation device may include a buffer, a buffer memory, and a computation unit. The buffer may be configured to classify the first input data into first to $n^{th}$ input feature sets each having at least first to $n^{th}$ features and store the first to $n^{th}$ input feature sets, where n is an integer equal to or more than two. The buffer memory may include first to $n^{th}$ memories, and be configured to store the first to $n^{th}$ features of the first to $n^{th}$ input feature sets in the first to $n^{th}$ memories. The first to $n^{th}$ features of one input feature set may be divisionally stored in the first to $n^{th}$ memories. The computation unit may be configured to receive the first to $n^{th}$ input feature sets stored in the buffer memory, and perform a computation operation on the first to $n^{th}$ input feature sets.

In an embodiment, an operation method of a system may include classifying first input data transferred from a host into first to $n^{th}$ input feature sets each having first to $n^{th}$ features to temporarily store the first to $n^{th}$ input feature sets, where n is an integer equal to or more than two. The operation method may include storing the first to $n^{th}$ features of the first to $n^{th}$ input feature sets in first to $n^{th}$ memories, wherein the first to $n^{th}$ features of one input feature set are divisionally stored in the first to $n^{th}$ memories, and features having the same turn in the first to $n^{th}$ input feature sets are stored evenly in the first to $n^{th}$ memories. The operation method may include outputting the features having the same turn in the first to $n^{th}$ input feature sets at the same time. Further, the operation method may include performing a computation operation on the outputted features of the first to $n^{th}$ input feature sets.

DETAILED DESCRIPTION

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Hereinafter, a buffer memory, a computation device, and a system using the same according to the present disclosure will be described below with reference to the accompanying drawings through exemplary embodiments.

Figure 1:
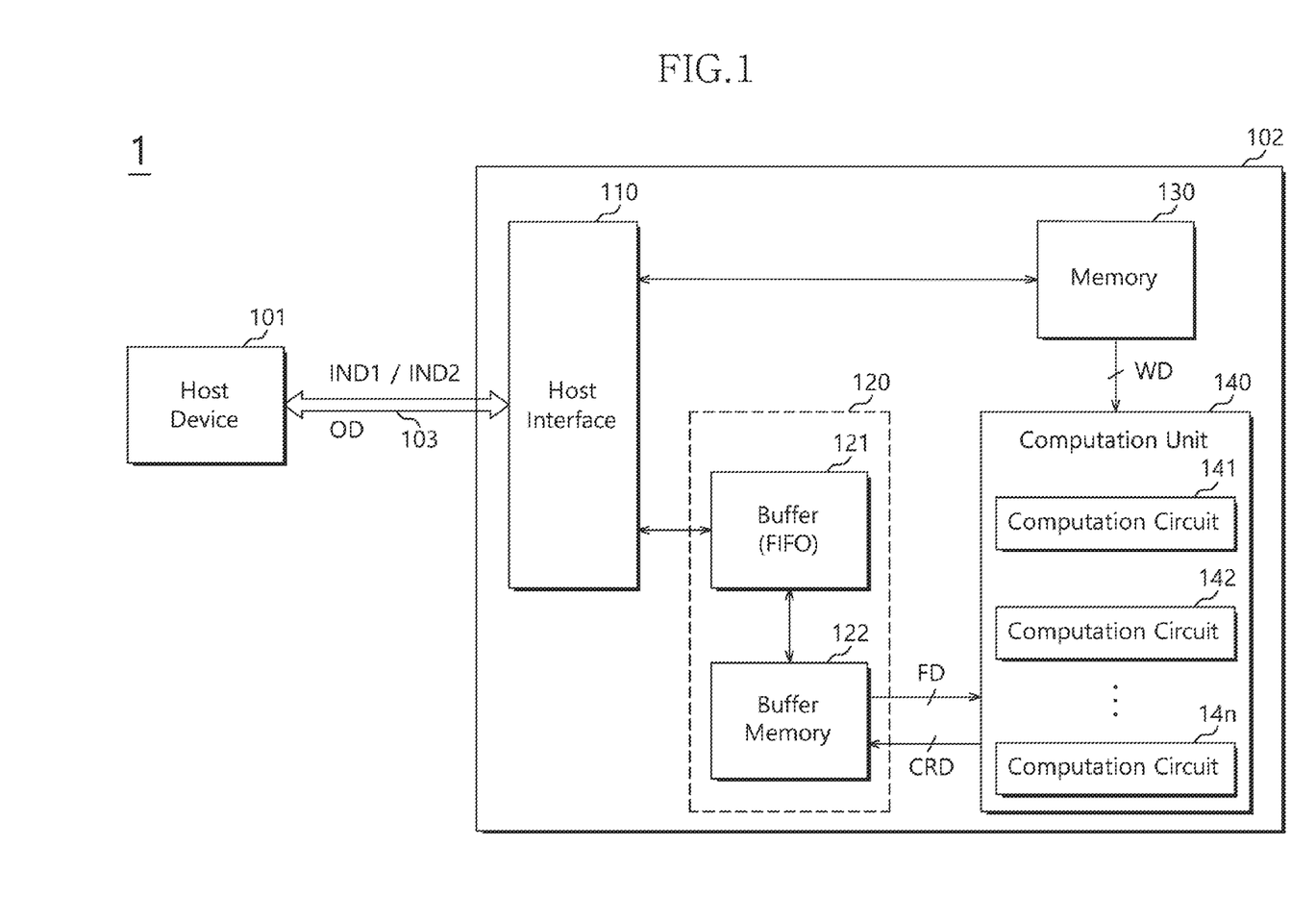
FIG. 1 is a diagram illustrating a configuration of a system in accordance with an embodiment.

FIG. 1 illustrates a configuration of a system in accordance with an embodiment. In FIG. 1, the system 1 may include a host device 101 and a computation device 102. The host device 101 may provide data to the computation device 102, and receive data outputted from the computation device 102. The host device 101 may be coupled to the computation device 102 through a system bus 103. The host device 101 may transfer input data IND1 and IND2 to the computation device 102 through the system bus 103. The host device 101 may receive output data OD from the computation device 102 through the system bus 103. The output data OD may be generated through a computation operation performed on the input data IND1 and IND2 by the computation device 102. The host device 101 may provide various control signals to the computation device 102 through the system bus 103 for the computation operation of the computation device 102. The input data may include first input data IND1 and second input data IND2. For example, the first input data IND1 may include information related to a set of input features. The second input data IND2 may include information related to weight data.

The computation device 102 may be coupled to the host device 101 through the system bus 103. The computation device 102 may receive the input data IND1 and IND2 transmitted from the host device 101 through the system bus 103. The computation device 102 may perform a computation operation on the input data IND1 and IND2, and may transmit the output data OD generated through the computation operation to the host device 101 through the system bus 103. The computation device 102 may be a neural network computation device, e.g., a DNN accelerator. The computation device 102 may receive the first and second input data IND1 and IND2 from the host device 101, and perform a computation operation on a set of input features and weight data. The computation operation may be a convolution operation or a MAC (Multiply and Accumulation) operation on the set of input features and the weight data.

The computation device 102 may include a host interface 110, a buffering circuit 120, a memory 130 and a computation unit 140. The host interface 110 may be coupled to the system bus 103 to receive the input data IND1 and IND2 transmitted from the host device 101, and provide the received input data IND1 and IND2 to the internal circuits of the computation device 102. The host interface 110 may transmit the output data OD generated from the computation device 102 to the host device 101 through the system bus 103. The host interface 110 may receive the first and second input data IND1 and IND2 through the system bus 103. The host interface 110 may provide the received first input data IND1 to the buffering circuit 120, and provide the received second input data IND2 to the memory 130. The host interface 110 may receive computation result data CRD outputted from the computation unit 140 via the buffering circuit 120. The host interface 110 may transmit the output data OD to the host device 101 by driving the system bus 103 based on the computation result data CRD generated from the computation unit 140.

The buffering circuit 120 may receive the first input data IND1 from the host interface 110. The buffering circuit 120 may classify the first input data IND1 into a plurality of input feature sets FD and store the plurality of input feature sets FD. Each of the input feature sets FD may include a plurality of (input) features. Each of the features may indicate unit data of the input feature set FD, which includes an arbitrary number of bits. The system bus 103 may have a data bandwidth different from the size of one feature. That is, the data bandwidth of the system bus 103 may be larger than the size of one feature. The first input data IND1 may be transmitted through the system bus 103 in synchronization with a clock signal, the number of bits contained in the first input data IND1 transmitted at a time through the system bus 103 may be larger than the number of bits contained in one feature, and the first input data IND1 transmitted at a time through the system bus 103 may include information on a plurality of features. Therefore, the buffering circuit 120 may classify the first input data IND1 into a plurality of input feature sets FD, and store the classified input feature sets FD. The buffering circuit 120 may provide the plurality of input feature sets FD to the computation unit 140. The buffering circuit 120 may perform a batch operation to provide the plurality of input feature sets FD to the computation unit 140 at the same time, in order to increase the computation efficiency of the computation unit 140. The buffering circuit 120 may receive the computation result data CRD generated through the computation operation by the computation unit 140, and provide the computation result data CRD to the host interface 110.

In specific, the buffering circuit 120 may include a buffer 121 and a buffer memory 122. The buffer 121 may receive the first input data IND1 and store the received first input data IND1. The buffer 121 may classify the first input data IND1 into a plurality of input feature sets FD, and individually store the plurality of input feature sets FD. The buffer 121 may include a plurality of FIFO (First-In First-Out) circuits. At least the number of the FIFO circuits may correspond to the number of the input feature sets FD which is capable of being included in the first input data IND1. The plurality of FIFO circuits may store the plurality of features of the respective input feature sets FD.

The buffer memory 122 may store an input feature set FD outputted from the buffer 121, and output the stored input feature set FD to the computation unit 140. The buffer memory 122 may store the plurality of input feature sets FD, and perform a batch operation to output the features of the respective input feature sets FD to the computation unit 140 at the same time. The buffer memory 122 may include a plurality of memories. The least number of the memories included in the buffer memory 122 may be the number of the input feature sets FD. The buffer memory 122 may divisionally store the features of the respective input feature sets FD into the plurality of memories. The plurality of memories may store one or more features of the respective input feature sets FD. The features of the respective input feature sets FD stored in the respective memories may be arranged in different orders. Features having the same turn in the plurality of input feature sets FD may not be stored in the same memory. For example, a memory that store an $I^{th}$ feature of one input feature set FD may not store $I^{th}$ features of the other input feature sets FD. Here, 'I' may be an integer between 1 and the number of features included in one input feature set. The buffer memory 122 may output the features of the respective input feature sets FD at the same time, and provide the features to the computation unit 140. The buffer memory 122 may output the features having the same turn in the plurality of input feature sets FD at the same time during a single read operation. For example, the buffer memory 122 may output the $I^{th}$ features of the plurality of input feature sets FD at the same time during a single read operation. The buffer 121 and the buffer memory 122 will be described below in detail.

In an embodiment, each of the memories in the buffer memory 122 may include a dual port SRAM (Static Random Access Memory). The plurality of memories may have a storage depth corresponding to the number of bits contained in at least one feature. For example, the plurality of memories may include a plurality of storage regions, and one storage region may store an equal or larger number of bits to or than the number of bits contained in one feature. The plurality of storage regions may be accessed based on different addresses.

The memory 130 may receive the second input data IND2 from the host interface 110. The memory 130 may classify the second input data IND2 into a plurality of weight data WD, and store the plurality of weight data WD. The memory 130 may provide the plurality of weight data WD to the computation unit 140. Each of the weight data WD may include a plurality of weights. The weight may indicate unit data of the weight data WD, which includes an arbitrary number of bits. In an embodiment, the memory 130 may include a DRAM (Dynamic Random Access Memory) or an SRAM (Static Random Access Memory).

The computation unit 140 may receive the plurality of input feature sets FD outputted from the buffering circuit 120 and the plurality of weight data WD outputted from the memory 130. The computation unit 140 may perform a computation operation on the input feature sets FD and the weight data WD. For example, the computation unit 140 may perform a convolution operation on the input feature sets FD and the weight data WD. The computation unit 140 may include a plurality of computation circuits 141, 142, . . . , 14n, The plurality of computation circuits 141, 142, . . . , 14n may be MAC computation circuits having the same structure. Each of the computation circuits 141, 142, . . . , 14n may perform a computation operation on the input feature set FD and the weight data WD to output the computation operation result. Each of the computation circuits 141, 142, . . . , 14n may include a plurality of processing elements, and the plurality of processing elements may receive the input feature set FD and the weight data WD in synchronization with a clock signal, and perform a MAC operation on the received input feature set FD and the received weight data WD. Each of the computation circuits 141, 142, . . ., 14n may include a systolic array configured to perform a MAC operation on the input feature set FD and the weight data WD.

Figure 2A:
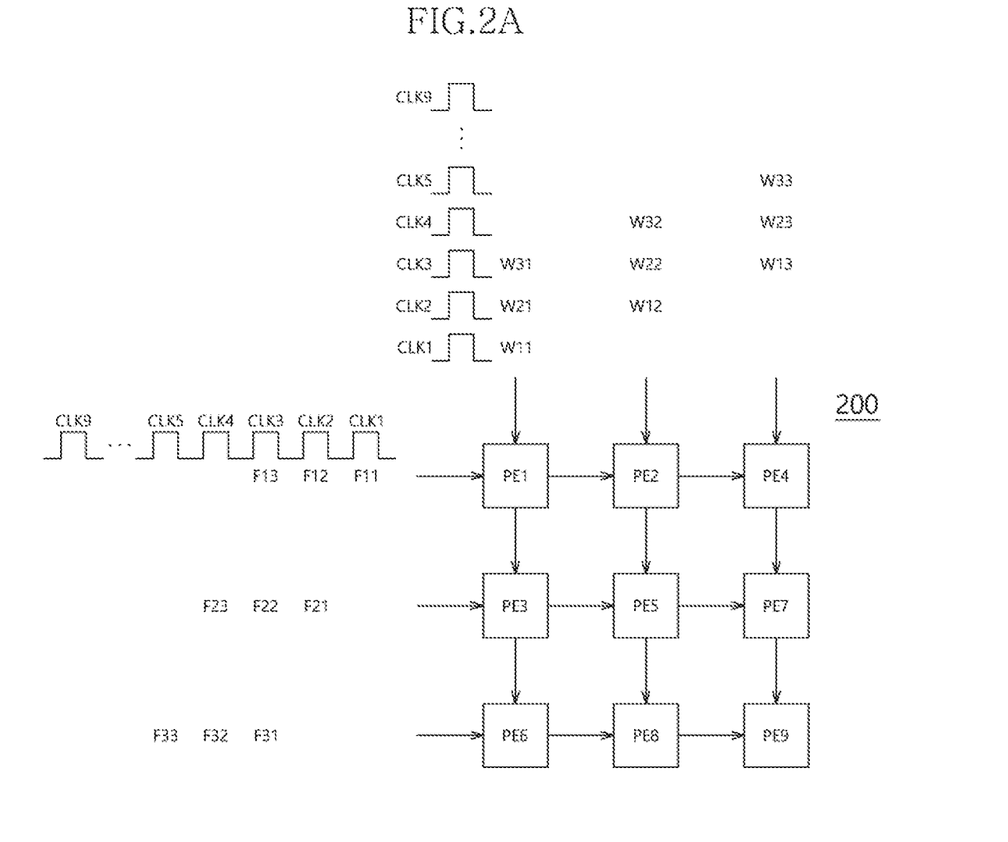
FIGS. 2A and 2B are diagrams illustrating a configuration and computation operation of a computation circuit in accordance with an embodiment.
Figure 2B:
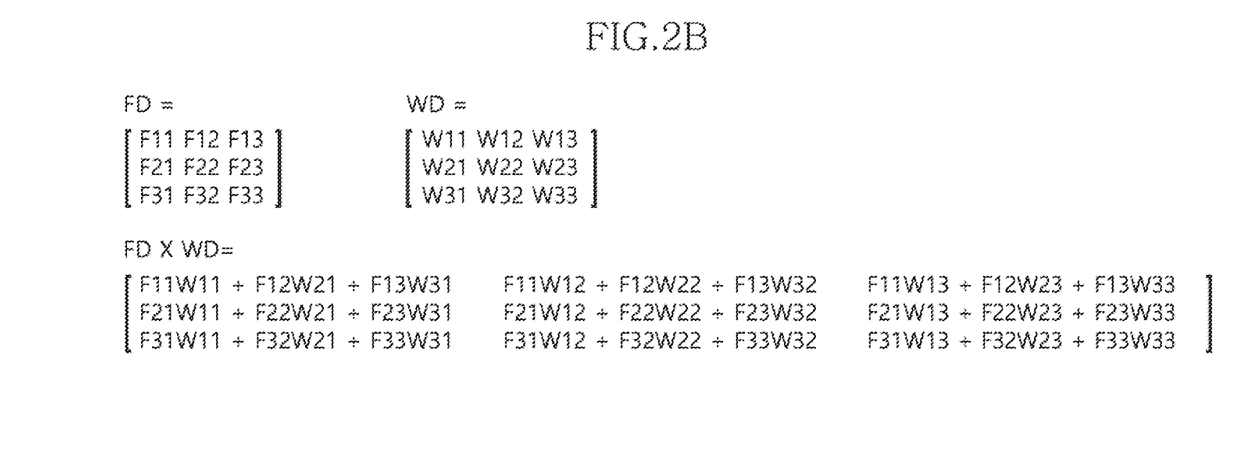

FIGS. 2A and 2B are diagrams illustrating a configuration and computation operation of a computation circuit 200 in accordance with an embodiment. In FIG. 2A, the computation circuit 200 may be a systolic array including a plurality of processing elements PE. The computation circuit 200 may be applied as each of the computation circuits 141 to 14n in FIG. 1. In FIG. 2A, the computation circuit 200 may receive three input feature sets each having three features as an input signal, and receive three weight data each having three weight signals. FIG. 2A illustrates that the computation circuit 200 includes nine processing elements PE1 to PE9 to perform a MAC operation on three input feature sets each having three features and three weight data each having three weight signals. However, the number of input feature sets, the number of features in one input feature set, the number of weight data, and the number of weight signals in one weight data may be smaller or larger than three. Thus, the number of the processing elements in the computation circuit 200 may also be decreased or increased.

The computation circuit 200 may include first to ninth processing elements PE1 to PE9. The processing elements PE1 to PE9 may sequentially receive the features and weight signals in the respective input feature sets and weight data in synchronization with a clock signal CLK defining unit cycles, and perform a MAC operation on the received features and weights. Each of the first to ninth processing elements PE1 to PE9 may include multiply logic, accumulation logic and a register. The first to ninth processing elements PE1 to PE9 may perform multiplications through the multiply logic and accumulations through the accumulation logic in parallel. FIG. 2B illustrates the input feature sets FD and the weight data WD, which are expressed as matrices, and a result FD X WD obtained by performing a convolution operation on the input feature sets FD and the weight data WD. Referring to FIGS. 2A and 2B, the operation of the computation circuit 200 will be described as follows.

When a first clock signal CLK1 toggles during a first unit cycle, the first processing element PE1 may receive a first feature F11 of a first input feature set and a first weight signal W11 of first weight data. The first processing element PE1 may generate F11W11 by multiplying the first feature F11 of the first input feature set by the first weight signal W11 of the first weight data. The first clock signal CLK1 may be a pulse signal that toggles in synchronization with a first clock cycle of the clock signal CLK. Similarly, second to ninth clock signal CLK2 to CLK9 may be pulse signals that toggle in synchronization with second to eight clock cycles of the clock signal CLK, respectively.

When the second clock signal CLK2 toggles during a second unit cycle, the first processing element PE1 may accumulate previously computed F11W11 and 0 and store the computation result. The first processing element PE1 may receive a second feature F12 of the first input feature set and a first weight signal W21 of second weight data. The first processing element PE1 may output the first feature F11 of the first input feature set to the second processing element PE2, and output the first weight signal W11 of the first weight data to the third processing element PE3. The first processing element PE1 may generate F12W21 by multiplying the second feature F12 of the first input feature set by the first weight signal W21 of the second weight data. The second processing element PE2 may receive a second weight signal W12 of the first weight data and receive the first feature F11 of the first input feature set from the first processing element PE1, in synchronization with the second clock signal CLK2.

The second processing element PE2 may generate F11W12 by multiplying the first feature F11 of the first input feature set by the second weight signal W12 of the first weight data. The third processing element PE3 may receive a first feature F21 of the second input feature set and receive the first weight signal W11 of the first weight data from the first processing element PE1, in synchronization with the second clock signal CLK2. The third processing element PE3 may generate F21W11 by multiplying the first feature F21 of the second input feature set by the first weight signal Wil of the first weight data.

When the third clock signal CLK3 toggles during a third unit cycle, the first processing element PE1 may accumulate previously computed F11W11 and F12W21, and store the computation result F11W11+F12W21. The first processing element PE1 may receive a third feature F13 of the first input feature set and a first weight signal W31 of the third weight data. The first processing element PE1 may output the second feature F12 of the first input feature set to the second processing element PE2, and output the first weight signal W21 of the second weight data to the third processing element PE3. The first processing element PE1 may generate F13W31 by multiplying the third feature F13 of the first input feature set by the first weight signal W31 of the third weight data. The second processing element PE2 may accumulate previously computed F11W12 and 0, and store the computation result. The second processing element PE2 may receive a second weight signal W22 of the second weight data and receive the second feature F12 of the first input feature set from the first processing element PE1. The second processing element PE2 may output the first feature F11 of the first input feature set to the fourth processing element PE4, and output the second weight signal W12 of the first weight data to the fifth processing element PE5. The second processing element PE2 may generate F12W22 by multiplying the second feature F12 of the first input feature set by the second weight signal W22 of the second weight data. The third processing element PE3 may accumulate previously computed F21W11 and 0 and store the computation result. The third processing element PE3 may receive a second feature F22 of the second input feature set and receive the first weight signal W21 of the second weight data from the first processing element PE1. The third processing element PE3 may output the first feature F21 of the second input feature set to the fifth processing element PE5, and output the first weight signal Wil of the first weight data to the sixth processing element PE6. The third processing element PE3 may generate F22W21 by multiplying the second feature F22 of the second input feature set by the first weight signal W21 of the second weight data. The fourth processing element PE4 may receive a third weight signal W13 of the first weight data and receive the first feature F11 of the first input feature set from the second processing element PE2, in synchronization with the third dock signal CLK3. The fourth processing element PE4 may generate F11W13 by multiplying the first feature F11 of the first input feature set by the third weight signal W13 of the first weight data. The fifth processing element PE5 may receive the second weight signal W12 of the first weight data from the second processing element PE2, and receive the first feature F21 of the second input feature set from the third processing element PE3. The fifth processing element PE5 may generate F21W12 by multiplying the first feature F21 of the second input feature set by the second weight signal W12 of the first weight data. The sixth processing element PE6 may receive a first feature F31 of the third input feature set and receive the first weight signal Wil of the first weight data from the third processing element PE3, in synchronization with the third clock signal CLK3. The sixth processing element PE6 may generate F31W11 by multiplying the first feature F31 of the third input feature set by the first weight signal Wil of the first weight data.

When the fourth clock signal CLK4 toggles during a fourth unit cycle, the first processing element PE1 may accumulate previously computed F11W11+F12W21 and F13W31, and store the computation result F11W11+F12W21+F13W31. The first processing element PE1 may output the third feature F13 of the first input feature set to the second processing element PE2, and output the first weight signal W31 of the third weight data to the third processing element PE3. The second processing element PE2 may accumulate previously computed F11W12 and F12W22, and store the computation result F11W12+F12W22. The second processing element PE2 may receive a second weight signal W32 of the third weight data and receive the third feature F13 of the first input feature set from the first processing element PE1. The second processing element PE2 may output the second feature F12 of the first input feature set to the fourth processing element PE4, and output the second weight signal W22 of the second weight data to the fifth processing element PE5. The second processing element PE2 may generate F13W32 by multiplying the third feature F13 of the first input feature set by the second weight signal W32 of the third weight data. The third processing element PE3 may accumulate previously computed F21W11 and F22W21, and store the computation result F21W11+F22W21. The third processing element PE3 may receive a third feature F23 of the second input feature set and receive the first weight signal W31 of the third weight data from the first processing element PE1. The third processing element PE3 may output the second feature F22 of the second input feature set to the fifth processing element PE5, and output the first weight signal W21 of the second weight data to the sixth processing element PE6. The third processing element PE3 may generate F23W31 by multiplying the third feature F23 of the second input feature set by the first weight signal W31 of the third weight data. The fourth processing element PE4 may receive a third weight signal W23 of the second weight data and receive the second feature F12 of the first input feature set from the second processing element PE2, in synchronization with the fourth clock signal CLK4. The fourth processing element PE4 may accumulate previously computed F11W13 and 0, and store the computation result. The fourth processing element PE4 may output the third weight signal W13 of the first weight data to the seventh processing element PE7. The fourth processing element PE4 may generate F12W23 by multiplying the second feature F12 of the first input feature set by the third weight signal W23 of the second weight data. The fifth processing element PE5 may accumulate previously computed F21W12 and 0, and store the computation result. The fifth processing element PE5 may receive the second weight signal W22 of the second weight data from the second processing element PE2, and receive the second feature F22 of the second input feature set from the third processing element PE3. The fifth processing element PE5 may output the first feature F21 of the second input feature set to the seventh processing element PE7, and output the second weight signal W12 of the first weight data to the eighth processing element PE8. The fifth processing element PE5 may generate F22W22 by multiplying the second feature F22 of the second input feature set by the second weight signal W22 of the second weight data. The sixth processing element PE6 may accumulate previously computed F31W11 and 0, and store the computation result. The sixth processing element PE6 may receive a second feature F32 of the third input feature set and receive the first weight signal W21 of the second weight data from the third processing element PE3. The sixth processing element PE6 may output the first feature F31 of the third input feature set to the eighth processing element PE8. The sixth processing element PE6 may generate F32W21 by multiplying the second feature F32 of the third input feature set by the first weight signal W21 of the second weight data. The seventh processing element PE7 may receive the third weight signal W13 of the first weight data from the fourth processing element PE4, and receive the first feature F21 of the second input feature set from the fifth processing element PE5. The seventh processing element PE7 may generate F21W13 by multiplying the first feature F21 of the second input feature set by the third weight signal W13 of the first weight data. The eighth processing element PE8 may receive the second weight signal W12 of the first weight data from the fifth processing element PE5, and receive the first feature F31 of the third input feature set from the sixth processing element PE6. The eighth processing element PE8 may generate F31W12 by multiplying the first feature F31 of the third input feature set by the second weight signal W12 of the first weight data.

When the fifth clock signal CLK5 toggles during a fifth unit cycle, the second processing element PE2 may accumulate previously computed F11W12+F12W22 and F13W32, and store the computation result F11W12+F12W22+F13W32. The second processing element PE2 may output the third feature F13 of the first input feature set to the fourth processing element PE4, and output the second weight signal W32 of the third weight data to the fifth processing element PE5. The third processing element PE3 may accumulate previously computed F21W11+F22W21 and F23W31, and store the computation result F21W11+F22W21+F23W31. The third processing element PE3 may output the third feature F23 of the second input feature set to the fifth processing element PE5, and output the first weight signal W31 of the third weight data to the sixth processing element PE6. The fourth processing element PE4 may accumulate previously computed F11W13 and F12W23, and store the computation result F11W13+F12W23. The fourth processing element PE4 may receive a third weight signal W33 of the third weight data and receive the third feature F13 of the first input feature set from the second processing element PE2. The fourth processing element PE4 may output the third weight signal W23 of the second weight data to the seventh processing element PE7. The fourth processing element PE4 may generate F13W33 by multiplying the third feature F13 of the first input feature set by the third weight signal W33 of the third weight data. The fifth processing element PE5 may accumulate previously computed F21W12 and F22W22, and store the computation result F21W12+F22W22. The fifth processing element PE5 may receive the second weight signal W32 of the third weight data from the second processing element PE2, and receive the third feature F23 of the second input feature set from the third processing element PE3. The fifth processing element PE5 may output the second feature F22 of the second input feature set to the seventh processing element PE7, and output the second weight signal W22 of the second weight data to the eighth processing element PE8. The fifth processing element PE5 may generate F23W32 by multiplying the third feature F23 of the second input feature set by the second weight signal W32 of the third weight data. The sixth processing element PE6 may accumulate previously computed F31W11 and F32W21, and store the computation result F31W11+F32W21. The sixth processing element PE6 may receive a third feature F33 of the third input feature set and receive the first weight signal W31 of the third weight data from the third processing element PEI The sixth processing element PE6 may output the second feature F32 of the third input feature set to the eighth processing element PE8. The sixth processing element PE6 may generate F33W31 by multiplying the third feature F33 of the third input feature set by the first weight signal W31 of the third weight data. The seventh processing element PE7 may accumulate previously computed F21W13 and 0, and store the computation result. The seventh processing element PE7 may receive the third weight signal W23 of the second weight data from the fourth processing element PE4, and receive the second feature F22 of the second input feature set from the fifth processing element PE5. The seventh processing element PE7 may output the third weight signal W13 of the first weight data to the ninth processing element PE9. The seventh processing element PE7 may generate F22W23 by multiplying the second feature F22 of the second input feature set by the third weight signal W23 of the second weight data. The eighth processing element PE8 may accumulate previously computed F31W12 and 0, and store the computation result. The eighth processing element PE8 may receive the second weight signal W22 of the second weight data from the fifth processing element PE5, and receive the second feature F32 of the third input feature set from the sixth processing element PE6. The eighth processing element PE8 may output the first feature F31 of the third input feature set to the ninth processing element PE9. The eighth processing element PE8 may generate F32W22 by multiplying the second feature F32 of the third input feature set by the second weight signal W22 of the second weight data. The ninth processing element PE9 may receive the third weight signal W13 of the first weight data from the seventh processing element PE7, and receive the first feature F31 of the third input feature set from the eighth processing element PE8. The ninth processing element PE9 may generate F31W13 by multiplying the first feature F31 of the third input feature set by the third weight signal W13 of the first weight data.

When the sixth clock signal CLK6 toggles during a sixth unit cycle, the fourth processing element PE4 may accumulate previously computed F11W13+F12W23 and F13W33, and store the computation result F11W13+F12W23+F13W33. The fourth processing element PE4 may output the third weight signal W33 of the third weight data to the seventh processing element PE7. The fifth processing element PE5 may accumulate previously computed F21W12+F22W22 and F23W32, and store the computation result F21W12+F22W22+F23W32. The fifth processing element PE5 may output the third feature F23 of the second input feature set to the seventh processing element PE7, and output the second weight signal W32 of the third weight data to the eighth processing element PE8. The sixth processing element PE6 may accumulate previously computed F31W11+F32W21 and F33W31, and store the computation result F31W11+F32W21+F33W31. The sixth processing element PE6 may output the third feature F33 of the third input feature set to the eighth processing element PE8. The seventh processing element PE7 may accumulate previously computed F21W13 and F22W23, and store the computation result F21W13+F22W23. The seventh processing element PE7 may receive the third weight signal W33 of the third weight data from the fourth processing element PE4, and receive the third feature F23 of the second input feature set from the fifth processing element PE5. The seventh processing element PE7 may output the third weight signal W23 of the second weight data to the ninth processing element PE9. The seventh processing element PE7 may generate F23W33 by multiplying the third feature F23 of the second input feature set by the third weight signal W33 of the third weight data. The eighth processing element PE8 may accumulate previously computed F31W12 and F32W22, and store the computation result F31W12+F32W22. The eighth processing element PE8 may receive the second weight signal W32 of the third weight data from the fifth processing element PE5, and receive the third feature F33 of the third input feature set from the sixth processing element PE6. The eighth processing element PE8 may output the second feature F32 of the third input feature set to the ninth processing element PE9. The eighth processing element PE8 may generate F33W32 by multiplying the third feature F33 of the third input feature set by the second weight signal W32 of the third weight data. The ninth processing element PE9 may accumulate previously computed F31W13 and 0, and store the computation result. The ninth processing element PE9 may receive the third weight signal W23 of the second weight data from the seventh processing element PE7, and receive the second feature F32 of the third input feature set from the eighth processing element PE8. The ninth processing element PE9 may generate F32W23 by multiplying the second feature F32 of the third input feature set by the third weight signal W23 of the second weight data.

When the seventh clock signal toggles during a seventh unit cycle, the seventh processing element PE7 may accumulate previously computed F21W13+F22W23 and F23W33, and store the computation result F21W13+F22W23+F23W33. The seventh processing element PE7 may output the third weight signal W33 of the third weight data to the ninth processing element PE9. The eighth processing element PE8 may accumulate previously computed F31W12+F32W22 and F33W32, and store the computation result F31W12+F32W22+F33W32. The eighth processing element PE8 may output the third feature F33 of the third input feature set to the ninth processing element PE9. The ninth processing element PE9 may accumulate previously computed F31W13 and F32W23, and store the computation result F31W13+F32W23. The ninth processing element PE9 may generate F33W33 by multiplying the third feature F33 of the third input feature set by the third weight signal W33 of the third weight data.

When the eighth clock signal toggles during an eighth unit cycle, the ninth processing element PE9 may accumulate previously computed F31W13+F32W23 and F33W33, and store the computation result F31W13+F32W23+F33W33. When the ninth clock signal toggles during a ninth unit cycle, the computation results stored in the first to ninth processing elements PE1 to PE9, respectively, may be outputted. As illustrated in FIG. 2B, the convolution operation results (FD×WD) of the first to third input feature sets FD and the first to third weight data WD may be outputted from the first to ninth processing elements PE1 to PE9.

Figure 3:
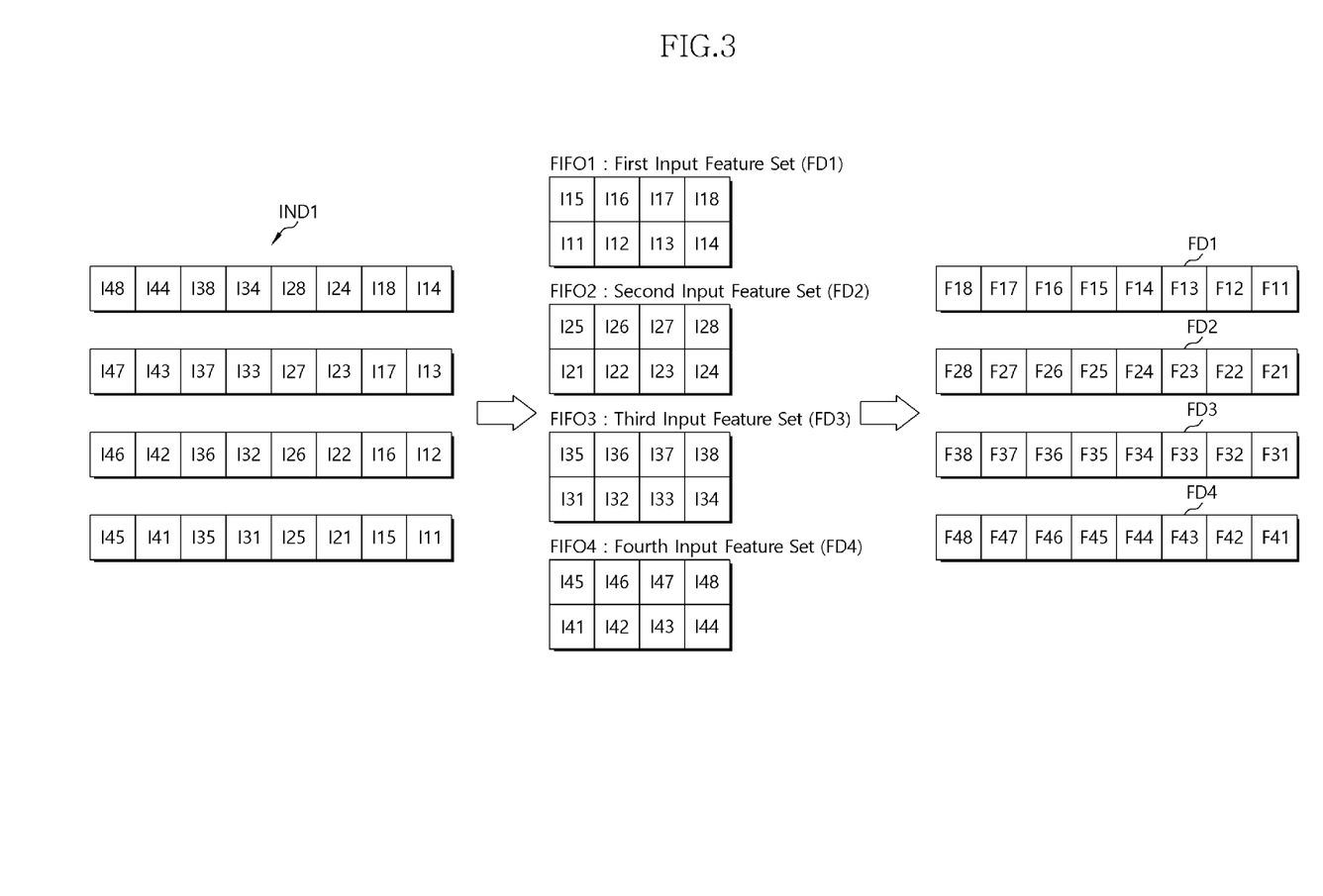
FIG. 3 is a diagram illustrating a data flow in the system in accordance with the present embodiment.

FIG. 3 is a diagram illustrating a data flow in the system 1 in accordance with the present embodiment. Referring to FIGS. 1 to 3, the host device 101 may transfer the first input data IND1 through the system bus 103. The first input data IND1 may include a plurality of input feature sets. The data bandwidth of the system bus 103 may be larger than the size of one feature, and data bits transferred at a time through the system bus 103 may include a plurality of features. For example, when the system bus 103 has a data bandwidth of 32 bits and one feature has a size of eight bits, four features may be transferred at a time through the system bus 103. When the first input data IND1 has 256 bits, the first input data IND1 may include four input feature sets each including eight features. FIG. 3 illustrates that the system bus 103 has a data bandwidth of 32 bits, but the system bus 103 may have a data bandwidth of 16 bits or less or 64 bits or more. Furthermore, FIG. 3 illustrates that one feature has a size of eight bits, but one feature may have a size of four bits or less or 16 bits or more.

The system bus 103 may include a plurality of buses. Hereafter, suppose that four features may be transferred at a time through the system bus 103, for clarity of description. The system bus 103 may include first to fourth buses. Each of the first to fourth buses may include a plurality of signal transfer lines. One signal transfer line may serve to transfer one bit of the first input data IND1. One bus may indicate signal transfer lines capable of transferring a plurality of bits corresponding to one feature. For example, one bus may include eight signal transfer lines, and one feature may include eight bits.

The first to fourth buses may serially transfer the bits of the first input data IND1. The first input data IND1 may be transferred over eight times through the first to fourth buses in synchronization with a clock signal, and include a total of 256 bits. The first bus may sequentially transfer first to eight bits (I11), 33rd to 40th bits (I15), 65th to 72nd bits (I21), 97th to 104th bits (I25), 129th to 136th bits (I31), 161st to 168th bits (I35), 193rd to 200th bits (I41) and 225th to 232nd bits (I45) of the first input data in synchronization with the clock signal. The first to eighth bits (I11) of the first input data IND1 may correspond to the first feature F11 of the first input feature set FD1. The 33rd to 40th bits (I15) of the first input data IND1 may correspond to a fifth feature F15 of the first input feature set FD1.

The 65th to 72nd bits (I21) of the first input data IND1 may correspond to the first feature F21 of the second input feature set FD2. The 97th to 104th bits (I25) of the first input data IND1 may correspond to a fifth feature F25 of the second input feature set FD2. The 129th to 136th bits (I31) of the first input data IND1 may correspond to the first feature F31 of the third input feature set FD3. The 161st to 168th bits (I35) of the first input data IND1 may correspond to a fifth feature F35 of the third input feature set FD3. The 193rd to 200th bits (I41) of the first input data IND1 may is correspond to a first feature F41 of a fourth input feature set FD4. The 225th to 232nd bits (I45) of the first input data IND1 may correspond to a fifth feature F45 of the fourth input feature set FD4.

The second bus may sequentially transfer ninth to 16th bits (I12), 41st to 48th bits (I16), 73rd to 80th bits (I22), 105th to 112th bits (I26), 137th to 144th bits (I32), 169th to 176th bits (I36), 201st to 208th bits (I42) and 233rd to 240th bits (I46) of the first input data IND1 in synchronization with the clock signal. The ninth to 16th bits (I12) of the first input data IND1 may correspond to the second feature F12 of the first input feature set FD1. The 41st to 48th bits (I16) of the first input data IND1 may correspond to a sixth feature F16 of the first input feature set FD1. The 73rd to 80th bits (I22) of the first input data IND1 may correspond to the second feature F22 of the second input feature set FD2. The 105th to 112th bits (I26) of the first input data IND1 may correspond to a sixth feature F26 of the second input feature set FD2. The 137th to 144th bits (I32) of the first input data IND1 may correspond to the second feature F32 of the third input feature set FD3. The 169th to 176th bits (I36) of the first input data IND1 may correspond to a sixth feature F36 of the third input feature set FD3. The 201st to 208th bits (I42) of the first input data IND1 may correspond to the second feature F42 of the fourth input feature set FD4. The 233rd to 240th bits (I46) of the first input data IND1 may correspond to a sixth feature F46 of the fourth input feature set FD4.

The third bus may sequentially transfer 17th to 24th bits (I13), 49th to 56th bits (I17), 81st to 88th bits (I23), 113th to 120th bits (I27), 145th to 152nd bits (I33), 177th to 184th bits (I37), 209th to 216th bits (I43) and 241st to 248th bits (I47) of the first input data IND1 in synchronization with the dock signal. The 17th to 24th bits (I13) of the first input data IND1 may correspond to the third feature F13 of the first input feature set FD1. The 49th to 56th bits (I17) of the first input data IND1 may correspond to a seventh feature F17 of the first input feature set FD1. The 81st to 88th bits (I23) of the first input data IND1 may correspond to the third feature F23 of the second input feature set FD2. The 113th to 120th bits (I27) of the first input data IND1 may correspond to a seventh feature F27 of the second input feature set FD2. The 145th to 152nd bits (I33) of the first input data IND1 may correspond to the third feature F33 of the third input feature set FD3. The 177th to 184th bits (I37) of the first input data IND1 may correspond to a seventh feature F37 of the third input feature set FD3. The 209th to 216th bits (I43) of the first input data IND1 may correspond to the third feature F43 of the fourth input feature set FD4. The 241st to 248th bits (I47) of the first input data IND1 may correspond to a seventh feature F47 of the fourth input feature set FD4.

The fourth bus may sequentially transfer 25th to 32nd bits (I14), 57th to 64th bits (I18), 89th to 96th bits (I24), 121st to 128th bits (I28), 153rd to 160th bits (I34), 185th to 192nd bits (I38), 217th to 224th bits (I44) and 249th to 256th bits (I48) of the first input data INDI in synchronization with the clock signal. The 25th to 32nd bits (I14) of the first input data INDI may correspond to a fourth feature F14 of the first input feature set FD1. The 57th to 64th bits (I18) of the first input data IND1 may correspond to an eighth feature F18 of the first input feature set FD1. The 89th to 96th bits (I24) of the first input data INDI may correspond to a fourth feature F24 of the second input feature set FD2. The 121st to 128th bits (I28) of the first input data IND1 may correspond to an eighth feature F28 of the second input feature set FD2. The 153rd to 160th bits (I34) of the first input data IND1 may correspond to a fourth feature F34 of the third input feature set FD3. The 185th to 192nd bits (I38) of the first input data IND1 may correspond to an eighth feature F38 of the third input feature set FD3. The 217th to 224th bits (I44) of the first input data IND1 may correspond to a fourth feature F44 of the fourth input feature set FD4. The 249th to 256th bits (I48) of the first input data IND1 may correspond to an eighth feature F48 of the fourth input feature set FD4.

The computation device 102 may include the buffering circuit 120 to classify the first input data IND1 into the plurality of input feature sets, and to provide the plurality of input feature sets FD to the computation unit 140. The buffer 121 of the buffering circuit 120 may include a plurality of FIFO circuits. A first FIFO circuit FIFO1 may store the first to 64th bits (I11 to I18) of the first input data IND1, and the information stored in the first FIFO circuit FIFO1 may correspond to the first input feature set FD1. A second FIFO circuit FIFO2 may store the 65th to 128th bits (I21 to I28) of the first input data IND1, and the information stored in the second FIFO circuit FIFO2 may correspond to the second input feature set FD2. A third FIFO circuit FIFO3 may store the 129th to 192nd bits (I31 to I38) of the first input data IND1, and the information stored in the third FIFO circuit FIFO3 may correspond to the third input feature set FD3. A fourth FIFO circuit FIFO4 may store the 193rd to 256th bits (I41 to I48) of the first input data IND1, and the information stored in the fourth FIFO circuit FIFO4 may correspond to the fourth input feature set FD4.

The buffer memory 122 of the buffering circuit 120 may perform the batch operation to provide the first to fourth input feature sets FD1 to FD4 to the computation unit 140 at the same time. Since the number of the input feature sets is four, the buffer memory 122 may include at least four memories. As illustrated in FIG. 3, the buffer memory 122 needs to divisionally store the features F11 to F18, F21 to F28, F31 to F38 and F41 to F48 of the first to fourth input feature sets FD1 to FD4 in the four memories, such that the features F11 to F18, F21 to F28, F31 to F38 and F41 to F48 of the first to fourth input feature sets FD1 to FD4 may be outputted at the same time. At this time, when one input feature set is stored in one memory, the batch operation may be sufficiently performed. However, the size of the input feature set may be variously changed depending on the types and characteristics of data or applications. However, the memory may have a fixed size and/or depth. Therefore, when a memory having an extremely small size is used, the memory may not store input feature sets having various sizes, and when a memory having an extremely large size is used, a large portion of the storage space of the memory may be wasted. Therefore, an efficient method capable of storing the input feature sets by using a memory having a minimum size may be required.

Figure 4:
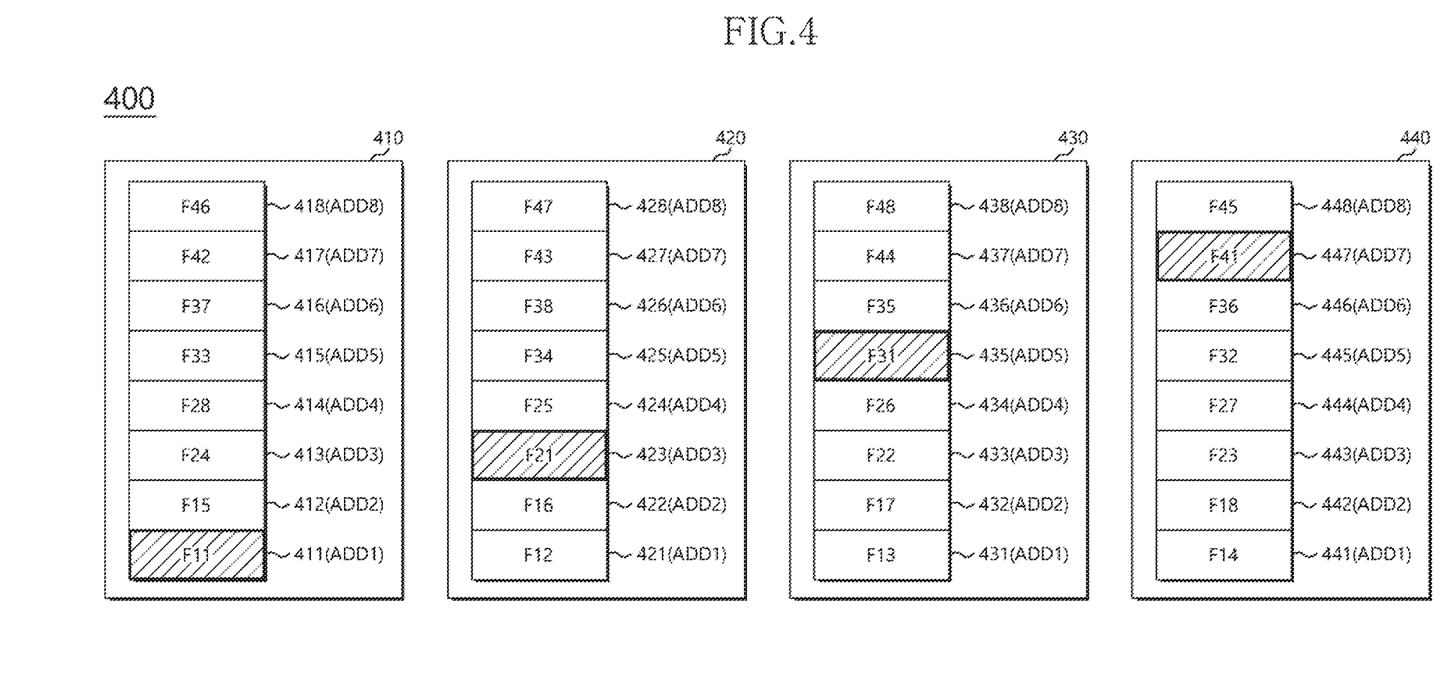
FIG. 4 is a diagram illustrating a configuration of a buffer memory and a method for storing a plurality of input feature sets in the buffer memory in accordance with an embodiment.

FIG. 4 is a diagram illustrating a configuration of a buffer memory 400 and a method for storing a plurality of input feature sets in the buffer memory 400 in accordance with an embodiment. The buffer memory 400 may be applied as the buffer memory 122 illustrated in FIG. 1. In FIG. 4, the buffer memory 400 may include first to fourth memories 410 to 440. The features F11 to F18, F21 to F28, F31 to F38 and F41 to F48 of the first to fourth input feature sets FD1 to FD4 each may be divisionally stored in the first to fourth memories 410 to 440. The first to fourth memories 410 to 440 may not store features having the same turn in the first to fourth input feature sets FD1 to FD4. The features of one input feature set may be divisionally stored in the first to fourth memories 410 to 440. The features having the same turn in the first to fourth input feature sets FD1 to FD4 may be divisionally stored one by one (i.e., evenly) in the first to fourth memories 410 to 440. The features having the same turn in the first to fourth input feature sets FD1 to FD4 may be divisionally stored in the first to fourth memories 410 to 440 so as not to overlap one another.

The orders in which the features F11 to F18, F21 to F28, F31 to F38 and F41 to F48 of the first to fourth input feature sets FD1 to FD4 are stored in the first to fourth memories 410 to 440, respectively, may be different from one another. The features F11 to F18, F21 to F28, F31 to F38 and F41 to F48 of the first to fourth input feature sets FD1 to FD4 may be divisionally stored in the first to fourth memories 410 to 440 in shifted order. For example, the first feature of a $k^{th}$ input feature set may be stored in a $k^{th}$ memory. Here, 'k' may be an integer between 1 and 4. The first to fourth features F11 to F14 of the first input feature set FD1 may be stored in the first to fourth memories 410 to 440, respectively, and the fifth to eighth features F15 to F18 of the first input feature set FD1 may be stored in the first to fourth memories 410 to 440, respectively. The order of the memories in which the first to eighth features F21 to F28 of the second input feature set FD2 are stored may be shifted. The first to third features F21 to F23 of the second input feature set FD2 may be stored in the second to fourth memories 420 to 440, respectively, and the fourth feature F24 of the second input feature set FD2 may be stored in the first memory 410. The fifth to seventh features F25 to F27 of the second input feature set FD2 may be stored in the second to fourth memories 420 to 440, respectively, and the eighth feature F28 of the second input feature set FD2 may be stored in the first memory 410. The order of the memories in which the first to eighth features F31 to F38 of the third input feature set FD3 are stored may be shifted. The first and second features F31 and F32 of the third input feature set FD3 may be stored in the third and fourth memories 430 and 440, respectively, and the third and fourth features F33 and F34 of the third input feature set FD3 may be stored in the first and second memories 410 and 420, respectively. The fifth and sixth features F35 and F36 of the third input feature set FD3 may be stored in the third and fourth memories 430 and 440, respectively, and the seventh and eighth features F37 and F38 of the third input feature set FD3 may be stored in the first and second memories 410 and 420, respectively. The order of the memories in which the first to eighth features F41 to F48 of the fourth input feature set FD4 are stored may be shifted. The first feature F41 of the fourth input feature set FD4 may be stored in the fourth memory 440, and the second to fourth features F42 to F44 of the fourth input feature set FD4 may be stored in the first to third memories 410 to 430, respectively. The fifth feature F45 of the fourth input feature set FD4 may be stored in the fourth memory 440, and the sixth to eighth features F46 to F48 of the fourth input feature set FD4 may be stored in the first to third memories 410 to 430, respectively.

Each of the first to fourth memories 410 to 440 may include a plurality of storage regions. Each of the storage regions may store one feature therein. The number of the plurality of regions may be equal to or more than the number of features included in one input feature set. FIG. 4 illustrates that each of the first to fourth memories 410 to 440 includes eight storage regions. However, each of the first to fourth memories 410 to 440 may include a larger number of storage regions to store an input feature set including more features. Different addresses may be allocated and/or mapped to the plurality of storage regions, respectively, and the plurality of storage regions may be accessed based on the allocated and/or mapped addresses.

Specifically, a method for storing the first to fourth input feature sets FD1 to FD4 in the first to fourth memories 410 to 440 will be described as follows. The first to fourth memories 410 to 440 may perform write operations to store the respective features F11 to F18, F21 to F28, F31 to F38 and F41 to F48 of the first to fourth input feature sets FD1 to FD4. The first feature F11 of the first input feature set FD1 may be stored in a first storage region 411 of the first memory 410. The second to fourth features F12 to F14 of the first input feature set FD1 may be stored in the first storage regions 421 to 441 of the second to fourth memories 420 to 440, respectively. The fifth to eighth features F15 to F18 of the first input feature set FD1 may be stored in the second storage regions 412, 422, 432 and 442 of the first to fourth memories 410 to 440, respectively. The first feature F21 of the second input feature set FD2 may be stored in a third storage region 423 of the second memory 420. The second and third features F22 and F23 of the second input feature set FD2 may be stored in the third storage regions 433 and 443 of the third and fourth memories 430 and 440, respectively. The fourth feature F24 of the second input feature set FD2 may be stored in a third storage region 413 of the first memory 410. The fifth to seventh features F25 to F27 of the second input feature set FD2 may be stored in a fourth storage regions 424, 434 and 444 of the second to fourth memories 420 to 440, respectively, and the eighth feature F28 of the second input feature set FD2 may be stored in the fourth storage region 414 of the first memory 410. The first feature F31 of the third input feature set FD3 may be stored in a fifth storage region 435 of the third memory 430. The second feature F32 of the third input feature set FD3 may be stored in a fifth storage regions 445 of the fourth memory 440, and the third and fourth features F33 and F34 of the third input feature set FD3 may be stored in the fifth storage regions 415 and 425 of the first and second memories 410 and 420, respectively. The fifth and sixth features F35 and F36 of the third input feature set FD3 may be stored in sixth storage regions 436 and 446 of the third and fourth memories 430 and 440, respectively, and seventh and eighth features F37 and F38 of the third input feature set FD3 may be stored in sixth storage regions 416 and 426 of the first and second memories 410 and 420, respectively. The first feature F41 of the fourth input feature set FD4 may be stored in a seventh storage region 447 of the fourth memory 440. The second to fourth features F42 to F44 of the fourth input feature set FD4 may be stored in the seventh storage regions 417, 427 and 437 of the first to third memories 410 to 430, respectively. The fifth feature F45 of the fourth input feature set FD4 may be stored in an eighth storage region 448 of the fourth memory 440, and the sixth to eighth features F46 and F48 of the fourth input feature set FD4 may be stored in eighth storage regions 418, 428 and 438 of the first to third memories 410 to 430, respectively.

The first to fourth memories 410 to 440 may store the first to fourth features F11 to F14 of the first input feature set FD1 in the first storage regions 411, 421, 431 and 441 of the first to fourth memories 410 to 440, respectively, at the same time, based on a first address ADD1. The first to fourth memories 410 to 440 may store the fifth to eighth features F15 to F18 of the first input feature set FD1 in the second storage regions 412, 422, 432 and 442 of the first to fourth memories 410 to 440, respectively, at the same time, based on a second address ADD2. The first to fourth memories 410 to 440 may store the first to fourth features F21 to F24 of the second input feature set FD2 in the third storage regions 413, 423, 433 and 443 of the first to fourth memories 410 to 440, respectively, at the same time, based on a third address ADD3. The first to fourth memories 410 to 440 may store the fifth to eighth features F25 to F28 of the second input feature set FD2 in the fourth storage regions 414, 424, 434 and 444 of the first to fourth memories 410 to 440, respectively, at the same time, based on a fourth address ADD4. The first to fourth memories 410 to 440 may store the first to fourth features F31 to F34 of the third input feature set FD3 in the fifth storage regions 415, 425, 435 and 445 of the first to fourth memories 410 to 440, respectively, at the same time, based on a fifth address ADD5. The first to fourth memories 410 to 440 may store the fifth to eighth features F35 to F38 of the third input feature set FD3 in the sixth storage regions 416, 426, 436 and 446 of the first to fourth memories 410 to 440, respectively, at the same time, based on a sixth address ADD6. The first to fourth memories 410 to 440 may store the first to fourth features F41 to F44 of the fourth input feature set FD4 in the seventh storage regions 417, 427, 437 and 447 of the first to fourth memories 410 to 440, respectively, at the same time, based on a seventh address ADD7. The first to fourth memories 410 to 440 may store the fifth to eighth features F45 to F48 of the fourth input feature set FD4 in the eighth storage regions 418, 428, 438 and 448 of the first to fourth memories 410 to 440, respectively, at the same time, based on an eighth address ADD8.

In an embodiment, when the number of features included in each of the first to fourth input feature sets FD1 to FD4 is smaller than eight, some storage regions of the first to fourth memories 410 to 440 may not be used. For example, when each of the first to fourth input feature sets FD1 to FD4 may include three features, the first to third features F11 to F13 of the first input feature set FD1 may be stored in the first storage regions 411, 421 and 431 of the first to third memories 410 to 430, respectively. The first to third features F21 to F23 of the second input feature set FD2 may be stored in the second storage regions 422 to 442 of the second to fourth memories 420 to 440, respectively. The first and second features F31 and F32 of the third input feature set FD3 may be stored in the third storage regions 433 and 443 of the third and fourth memories 430 and 440, respectively, and the third feature F33 of the third input feature set FD3 may be stored in the third storage region 413 of the first memory 410. The first feature F41 of the fourth input feature set FD4 may be stored in the fourth storage region 444 of the fourth memory 440, and the second and third features F42 and F43 of the fourth input feature set FD4 may be stored in the fourth storage regions 414 and 424 of the first and second memories 410 and 420, respectively.

The first to fourth memories 410 to 440 may output features having the same turn in the first to fourth input feature sets FD1 to FD4 at the same time, during a single read operation. During a first read operation, the first to fourth memories 410 to 440 may output the first features F11, F21, F31 and F41 of the first to fourth input feature sets FD1 to FD4 at the same time, based on the first address ADD1, the third address ADD3, the fifth address ADD5 and the seventh address ADD7, respectively. The first features F11, F21, F31 and F41 of the first to fourth input feature sets FD1 to FD4 may be provided to four computation circuits of the computation unit 140, respectively. During a second read operation, the first to fourth memories 410 to 440 may output the second features F12 to F42 of the first to fourth input feature sets FD1 to FD4 at the same time, based on the seventh address ADD7, the first address ADD1, the third address ADD3 and the fifth address ADD5, respectively. The second features F12 to F42 of the first to fourth input feature sets FD1 to FD4 may be provided to the four computation circuits, respectively. During a third read operation, the first to fourth memories 410 to 440 may output the third features F13 to F43 of the first to fourth input feature sets FD1 to FD4 at the same time, based on the fifth address ADD5, the seventh address ADD7, the first address ADD1 and the third address ADD3, respectively. The third features F13 to F43 of the first to fourth input feature sets FD1 to FD4 may be provided to the four computation circuits of the computation unit 140, respectively. During a fourth read operation, the first to fourth memories 410 to 440 may output the fourth features F14 to F44 of the first to fourth input feature sets FD1 to FD4 at the same time, based on the third address ADD3, the fifth address ADD5, the seventh address ADD7 and the first address ADD1, respectively. The fourth features F14, F24, F34 and F44 of the first to fourth input feature sets FD1 to FD4 may be provided to the four computation circuits, respectively. During a fifth read operation, the first to fourth memories 410 to 440 may output the fifth features F15, F25, F35 and F45 of the first to fourth input feature sets FD1 to FD4 at the same time, based on the second address ADD2, the fourth address ADD4, the sixth address ADD6 and the eighth address ADD8, respectively. The fifth features F15, F25, F35, and F45 of the first to fourth input feature sets FD1 to FD4 may be provided to the four computation circuits, respectively. During a sixth read operation, the first to fourth memories 410 to 440 may output the sixth features F16 to F46 of the first to fourth input feature sets FD1 to FD4 at the same time, based on the eighth address ADD8, the second address ADD2, the fourth address ADD4 and the sixth address ADD6, respectively. The sixth features F16 to F46 of the first to fourth input feature sets FD1 to FD4 may be provided to the four computation circuits, respectively. During a seventh read operation, the first to fourth memories 410 to 440 may output the seventh features F17 to F47 of the first to fourth input feature sets FD1 to FD4 at the same time, based on the sixth address ADD6, the eighth address ADD8, the second address ADD2 and the fourth address ADD4, respectively. The seventh features F17 to F47 of the first to fourth input feature sets FD1 to FD4 may be provided to the four computation circuits, respectively. During an eighth read operation, the first to fourth memories 410 to 440 may output the eighth features F18 to F48 of the first to fourth input feature sets FD1 to FD4 at the same time, based on the fourth address ADD4, the sixth address ADD6, the eighth address ADD8 and the second address ADD2, respectively. The eighth features F18 to F48 of the first to fourth input feature sets FD1 to FD4 may be provided to the four computation circuits, respectively. The computation unit 140 may sequentially receive the first to eighth features F11 to F18, F21 to F28, F31 to F38 and F41 to F48 of the first to fourth input feature sets FD1 to FD4 from the buffer memory 122, and perform computation operations on the first to fourth input feature sets FD1 to FD4 at the same time. In the present embodiment, the computation device and the system may perform the batch operation for the plurality of input feature sets by using the memory having a small size, thereby increasing the operation efficiency of the system and reducing the fabrication cost of the computation device.

While various embodiments have been described above, it will be understood to those skilled in the art that the embodiments described are examples only. Accordingly, the computation device and the system described herein should not be limited based on the described embodiments.

What is claimed is:
1. A computation device comprising:
   a buffer memory comprising first to $n^{th}$ memories, and configured to store first to $n^{th}$ input feature sets each including a plurality of features in the first to $n^{th}$ memories, and divisionally store the plurality of features of one input feature set into the first to $n^{th}$ memories, wherein features having the same turn in the first to $n^{th}$ input feature sets are stored one by one in the first to $n^{th}$ memories and the features having same turn in the first to $n^{th}$ input features are respectively stored into different storage regions of the first to $n^{th}$ memories accessed based on addresses which are different from one another, where n is an integer equal to or larger than two; and
   a computation unit comprising first to $n^{th}$ computation circuits, each of the first to $n^{th}$ computation circuits is coupled to the first to $n^{th}$ memory, and configured to receive the features having the same turn in the first to $n^{th}$ input feature sets from the first to $n^{th}$ memories based on the addresses during a single read operation, and perform computation operations on the first and $n^{th}$ input feature sets.

2. The computation device according to claim 1, wherein the buffer memory stores a first feature among the plurality of features of a $k^{th}$ input feature set in a $k^{th}$ memory, where k is an integer between 1 and n.

3. The computation device according to claim 2, wherein the buffer memory stores an $(n+1)^{th}$ feature among the plurality of features of the $k^{th}$ input feature set, in the $k^{th}$ memory.

4. The computation device according to claim 1, wherein the buffer memory stores first to $1^{th}$ features of the first input feature set in the first to $1^{th}$ memories, respectively, at the same time, where 1 is an integer between 2 and n.

5. The computation device according to claim 1, wherein the buffer memory outputs the features having the same turn in the first to $n^{th}$ input feature sets at the same time, during the single read operation.

6. A computation device comprising:
a buffer memory comprising first to fourth memories, and configured to store first to fourth input feature sets each having at least first to fourth features in the first to fourth memories, and divide and store first to fourth features of one input feature set in the first to fourth memories, wherein features having the same turn in the first to fourth input feature sets are divided and stored in the first to fourth memories so as not to overlap one another and the features having same turn in the first to fourth input features are respectively stored into different storage regions of the first to fourth memories accessed based on addresses which are different from one another; and
a computation unit comprising first to fourth computation circuits, each of the first to fourth computation circuits is coupled to the first to fourth memory, and configured to receive the features having the same turn in the first to fourth input feature sets from the first to fourth memories based on the addresses during a single read operation, and perform computation operations on the first and fourth input feature sets.

7. The computation device according to claim 6, wherein the first feature of the first input feature set is stored in a first storage region of the first memory, the second feature of the first input feature set is stored in a first storage region of the second memory, the third feature of the first input feature set is stored in a first storage region of the third memory, and the fourth feature of the first input feature set is stored in a first storage region of the fourth memory.

8. The computation device according to claim 7, wherein the first feature of the second input feature set is stored in a second storage region of the second memory, the second feature of the second input feature set is stored in a second storage region of the third memory, the third feature of the second input feature set is stored in a second storage region of the fourth memory, and the fourth feature of the second input feature set is stored in a second storage region of the first memory.

9. The computation device according to claim 8, wherein the first feature of the third input feature set is stored in a third storage region of the third memory, the second feature of the third input feature set is stored in a third storage region of the fourth memory, the third feature of the third input feature set is stored in a third storage region of the first memory, and the fourth feature of the third input feature set is stored in a third storage region of the second memory.

10. The computation device according to claim 9, wherein the first feature of the fourth input feature set is stored in a fourth storage region of the fourth memory, the second feature of the fourth input feature set is stored in a fourth storage region of the first memory, the third feature of the fourth input feature set is stored in a fourth storage region of the second memory, and the fourth feature of the fourth input feature set is stored in a fourth storage region of the third memory.

11. The computation device according to claim 6, wherein the buffer memory outputs the first features of the first to fourth input feature sets at the same time, during a first read operation.

12. The computation device according to claim 11, wherein the buffer memory outputs the second features of the first to fourth input feature sets at the same time, during a second read operation.

13. The computation device according to claim 12, wherein the buffer memory outputs the third features of the first to fourth input feature sets at the same time, during a third read operation.

14. The computation device according to claim 13, wherein the buffer memory outputs the fourth features of the first to fourth input feature sets at the same time, during a fourth read operation.

15. A system comprising:
a host device configured to transfer first input data through a system bus; and
a computation device configured to receive the first input data and perform a computation operation on the first input data,
wherein the computation device comprises:
a buffer configured to classify the first input data into first to $n^{th}$ input feature sets each having at least first to $n^{th}$ features and store the first to $n^{th}$ input feature sets, where n is an integer equal to or more than two;
a buffer memory comprising first to $n^{th}$ memories, and configured to store the first to $n^{th}$ features of the first to $n^{th}$ input feature sets in the first to $n^{th}$ memories, wherein the first to $n^{th}$ features of one input feature set are divisionally stored in the first to $n^{th}$ memories, wherein features having same turn in the first to $n^{th}$ input features are respectively stored into different storage regions of the first to $n^{th}$ memories accessed based on addresses which are different from one another; and
a computation unit comprising first to $n^{th}$ computation circuits, each of the first to $n^{th}$ computation circuits is coupled to the first to $n^{th}$ memory, and configured to receive the features having the same turn in the first to $n^{th}$ input feature sets from the first to $n^{th}$ memories based on the addresses during a single read operation, and perform computation operations on the first and $n^{th}$ input feature sets.

16. The system according to claim 15, wherein the buffer comprises n FIFO (First-In First-Out) circuits configured to store the first to $n^{th}$ input feature sets, respectively.

17. The system according to claim 15, wherein the buffer memory stores features having the same turn in the first to $n^{th}$ input feature sets, evenly in the first to $n^{th}$ memories.

18. The system according to claim 15, wherein each of the first to $n^{th}$ input feature sets further comprises an $(n+1)^{th}$ feature,
wherein the buffer memory stores each $(n+1)^{th}$ feature of the first to $n^{th}$ input feature sets in the memories in which the first features of the first to $n^{th}$ input feature sets are stored, respectively.

19. The system according to claim 15, wherein the buffer memory outputs the features having the same turn in the first to $n^{th}$ input feature sets at the same time, during a single read operation.

20. The system according to claim 15, wherein the host device further transfers second input data through the system bus, and
wherein the computation device further comprises a memory configured to store the second input data and output the second input data as weight data to the computation unit.

21. A computation device comprising:
a buffer memory comprising at least first and second memories, and configured to store first and second input feature sets each including at least two features in the first and second memories, and configured to store a first feature of the first input feature into the first memory, store a second feature of the first input feature set into the second memory, store a first feature of the second input feature set into the second memory, and store a second feature of the second input feature set into the first memory, wherein the first feature of the first input feature set is stored into a first storage region of the first memory which is mapped based on a first address and the first feature of the second input feature set is stored into a second storage region of the second memory which is mapped based on a second address; and
a computation unit configured to receive the first features of the first and second input feature sets from the first and second memories during a first read operation, receive the second features of the first and second input feature sets from the first and second memories during a second read operation, and perform computation operations on the first and second input feature sets.

22. The computation device of claim 21, wherein the first input feature set further includes a third feature and the second input feature set further includes a third feature, and
wherein the buffer memory stores the third feature of the first input feature set into the first memory and stores the third feature of the second input feature set into the second memory.

23. The computation device of claim 22, wherein the first and second memories outputs the first features of the first and second input feature sets during the first read operation, outputs the second features of the first and second input feature sets during the second read operation, and output the third features of the first and second input features during a third read operation.

24. The computation device of claim 23, the computation unit comprising a first computation circuit and a second computation circuit,
wherein the first computation circuit receives the first feature of the first input feature set from the first memory and the second computation circuit receives the first feature of the second input feature set from the second memory, during the first read operation,
the first computation circuit receives the second feature of the first input feature set from the second memory and the second computation circuit receives the second feature of the second input feature set from the first memory, during the second read operation, and
the first computation circuit receives the third feature of the first input feature set from the first memory and the second computation circuit receives the third feature of the second input feature set from the second memory, during the third read operation.

* * * * *